US006434928B1

(12) United States Patent
Manaka

(10) Patent No.: US 6,434,928 B1
(45) Date of Patent: Aug. 20, 2002

(54) APPARATUS AND METHOD OF PURIFICATION OF EXHAUST EMISSION OF INTERNAL COMBUSTION ENGINE

(75) Inventor: Toshio Manaka, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/653,166

(22) Filed: Sep. 1, 2000

(30) Foreign Application Priority Data

Feb. 28, 2000 (JP) .................................... 2000-056044

(51) Int. Cl.⁷ ................................................ F01N 3/00
(52) U.S. Cl. ......................... 60/274; 60/277; 60/280; 60/285; 60/297; 180/65.2; 180/65.3; 180/65.4
(58) Field of Search ........................ 60/274, 275, 276, 60/277, 280, 285, 297; 180/65.2, 65.3, 65.4

(56) References Cited

U.S. PATENT DOCUMENTS

| 5,323,868 A | * | 6/1994 | Kawashima ............... 180/65.4 |
| 5,327,992 A | | 7/1994 | Boll |
| 5,483,795 A | * | 1/1996 | Katoh et al. ................. 60/276 |
| 5,771,685 A | * | 6/1998 | Hepburn ...................... 60/274 |
| 5,778,666 A | * | 7/1998 | Cullen et al. ................. 60/274 |
| 5,785,138 A | * | 7/1998 | Yoshida ..................... 180/65.2 |
| 6,009,965 A | * | 1/2000 | Takanohashi et al. ....... 180/65.2 |
| 6,109,025 A | * | 8/2000 | Murata et al. ................. 60/297 |
| 6,173,571 B1 | * | 1/2001 | Kaneko et al. ............... 60/286 |

FOREIGN PATENT DOCUMENTS

| EP | 0597106 | 4/1993 |
| EP | 0560991 | 9/1993 |
| EP | 0860595 | 8/1998 |
| EP | 0899151 | 3/1999 |
| FR | 2784626 | 4/2000 |
| JP | 9-317447 | 12/1997 |
| JP | 11-62653 | 3/1999 |
| WO | WO 93/07363 | 4/1993 |
| WO | WO 93/08383 | 4/1993 |
| WO | WO 98/12423 | 3/1998 |

* cited by examiner

Primary Examiner—Thomas Denion
Assistant Examiner—Binh Tran
(74) Attorney, Agent, or Firm—Crowell & Moring LLP

(57) ABSTRACT

Exhaust gas purification method and system of an internal combustion engine. The internal combustion engine comprises a generator driven by said internal combustion engine, a battery charged with an electricity generation output from the generator, and a NOx adsorption catalyst placed in an exhaust gas passage. The catalyst chemisorbs NOx in a state where the amount of an oxidizer is larger than that of a reducer in the stoichiometry relation of oxidoreduction between components contained in exhaust gas exhausted from said internal combustion engine and catalytically reduces the adsorbed or absorbed NOx in a state where the amount of the reducer is at least equivalent to that of the oxidizer. When the time-elapsing deterioration of the NOx adsorption catalyst reaches to a predetermined degree, the combustion condition of said internal combustion engine is controlled at the stoichiometric air-fuel ratio or an excess fuel air-fuel ratio in a predetermined time period to reactivate the NOx adsorption catalyst from the time-elapsing deterioration, and the increased proportion of the internal combustion engine output generated during the above time period is absorbed with said generator.

3 Claims, 13 Drawing Sheets

APPARATUS AND METHOD OF PURIFICATION OF EXHAUST EMISSION OF INTERNAL COMBUSTION ENGINE

BACKGROUND OF THE INVENTION

The present invention relates to a system which purifies or controls exhaust emission from an internal combustion engine of a vehicle and a method of purifying it. Particularly, it relates to an exhaust gas-purification system used for a vehicle or a hybrid type electric vehicle having an internal combustion engine which can be operated in a lean air-fuel ratio (lean burn) and a method of purifying the exhaust gas.

Carbon monoxide (CO), hydrocarbon (HC), nitrogen oxide (NOx), etc., contained in exhaust gas exhausted from internal combustion engines used for vehicles are well known as air pollutants.

Great deals of efforts have been made for reducing release of these substances. Improvements in the combustion method of the internal combustion engine have fundamentally reduced the generation amounts of the pollutants. Further, there have been pursued developments of a method for purifying the exhaust gas by utilizing a catalyst or the like. These efforts yield steady results.

In particular, with regard to a gasoline engine vehicle, the mainstream is a method of utilizing a catalyst containing Pt and Rh as main active components, which is a three-way catalyst and performs oxidation of HC and CO and reduction of NOx at the same time.

By the way, the three-way catalyst generally has physical properties in which the three-way catalyst effectively purifies only exhaust gas generated by burning gasoline fuel nearly at the stoichiometric air-fuel ratio.

While the air-fuel ratio varies depending upon the operation condition of vehicle, the range of variation thereof is adjusted nearly at the stoichiometric air-fuel ratio in principle. In the case of gasoline fuel, weight of air (A)/weight of fuel (F)=about 14.7; the stoichiometric air-fuel ratio will be represented by A/F=14.7 in the present specification hereinafter, while the above value may slightly varies depending upon the kind of fuel.

When the internal combustion engine is operated in a lean air-fuel ratio leaner than the stoichiometric air-fuel ratio, fuel economy can be improved. Therefore, there is also proposed a technique for performing combustion with leaner air-fuel mixture in view of resource saving.

Under the above circumstances, developments of a lean-burn combustion technique have been pursued. Recently, it becomes possible to burn an air-fuel mixture in a lean range of an air-fuel ratio of 18 or higher.

However, when a lean-burn exhaust gas is purified with a conventional three-way catalyst as described above, the problem is that HC and CO can be oxidized but NOx can not be effectively reduced.

Therefore, for applying a lean-burn system to heavy duty vehicles and extending engine operating area in the lean-burn combustion, in other words, extending an operation range to which the lean-burn system may be applied, there is required a lean-burn compatible technique of purifying the exhaust gas.

So, there have been vigorously pursued developments of the lean-burn compatible technique for purifying the exhaust gas, that is, a technique which purifies HC, CO and NOx in exhaust gas containing a considerable amount of oxygen ($O_2$), particularly developments of a technique which purifies NOx.

These techniques are proposed in, for example, publications of WO93/07363 and WO93/08383, JP-A-9-317447 publication and JP-A-11-62653 publication.

According to the techniques disclosed in the publications of WO93/07363 and WO93/08383, the exhaust gas always flows in a NOx absorbent, NOx is absorbed when the air/fuel ratio is lean, and when the concentration of $O_2$ in the exhaust gas is decreased, the absorbed NOx is released, whereby the absorbent may be reactivated.

However, a material which can absorb NOx when the air/fuel ratio is lean, and release NOx when the concentration of $O_2$ in the exhaust gas is decreased, has the following problems. The above material absorbs sulfur contained in the exhaust gas so that its NOx absorption capability is decreased. Further, when the concentration of $O_2$ in the exhaust gas is decreased, the fuel economy of the internal combustion engine deteriorates so that the improvement in the fuel economy owing to the lean-burn is impaired.

Further, the JP-A-9-317447 publication discloses a technique which estimates the sulfur absorption amount of a NOx catalyst and performs a treatment for decreasing the concentration of $O_2$ in the exhaust gas when the estimated value exceeds a predetermined amount. However, the problem is that the fuel economy of the internal combustion engine deteriorates.

Furthermore, the JP-A-11-62653 publication discloses a technique for absorbing a torque shock of a hybrid vehicle having a lean NOx catalyst at a NOx reactivating treatment by means of regeneration braking of a motor. However, similarly to the techniques disclosed in the above-mentioned publications of WO93/07363 and WO93/08383, the problem is that the NOx adsorption catalyst deteriorates due to the sulfur contained in the exhaust gas.

SUMMARY OF THE INVENTION

It is an object of the present invention to prevent variation of an increase in the torque or output of an internal combustion engine(these are generically called "engine output" hereinafter, and, of course, the same definition is used throughout the claims) at a time of reactivating a NOx catalyst, and concurrently recover an energy corresponding to the increased proportion of the engine output.

According to the present invention, there is provided an exhaust gas purification method of an internal combustion engine. The internal combustion engine comprises a generator driven by said internal combustion engine, a battery charged with an electricity generation output from the generator, and a NOx adsorption catalyst placed in an exhaust gas passage. The catalyst chemisorbs NOx in a state where the amount of an oxidizer is larger than that of a reducer in the stoichiometry relation of oxidoreduction between components contained in exhaust gas exhausted from said internal combustion engine and catalytically reduces the adsorbed or absorbed NOx in a state where the amount of the reducer is at least equivalent to that of the oxidizer. When the time-elapsing deterioration of the NOx adsorption catalyst reaches to a predetermined degree, the combustion condition of said internal combustion engine is controlled at the stoichiometric air-fuel ratio or an excess fuel air-fuel ratio in a predetermined time period to reactivate the NOx adsorption catalyst from the time-elapsing deterioration, and the increased proportion of the engine output generated during the above time period is absorbed with said generator.

According to the present invention, further, there is provided an exhaust gas purification system of an internal combustion engine. The internal combustion engine comprises a generator driven by said internal combustion engine, a battery charged with an electricity generation output from said generator, and a NOx adsorption catalyst placed in an exhaust gas passage. The catalyst chemisorbs NOx in a state where the amount of an oxidizer is larger than that of a reducer in the stoichiometry relation of oxidoreduction between components contained in exhaust gas exhausted from said internal combustion engine and catalytically reduces the adsorbed or absorbed NOx in a state where the amount of the reducer is at least equivalent to that of the oxidizer. The engine further comprises a time-elapsing deterioration evaluation means for evaluating that the time-elapsing deterioration of the NOx adsorption catalyst reaches to a predetermined degree, an air-fuel mixture control means for controlling the combustion condition of said internal combustion engine to the stoichiometric air-fuel ratio or an excess fuel air-fuel ratio in a predetermined time period when it is evaluated by said time-elapsing deterioration evaluation means that the time-elapsing deterioration of the NOx adsorption catalyst reaches to a predetermined degree, and an absorption means which makes said generator absorb the increased proportion of the engine output generated while the combustion condition of the internal combustion engine is controlled to the stoichiometric air-fuel ratio or an excess fuel air-fuel ratio by said air-fuel mixture control means.

DESCRIPTION OF THE EMBODIMENTS

Figure 1:
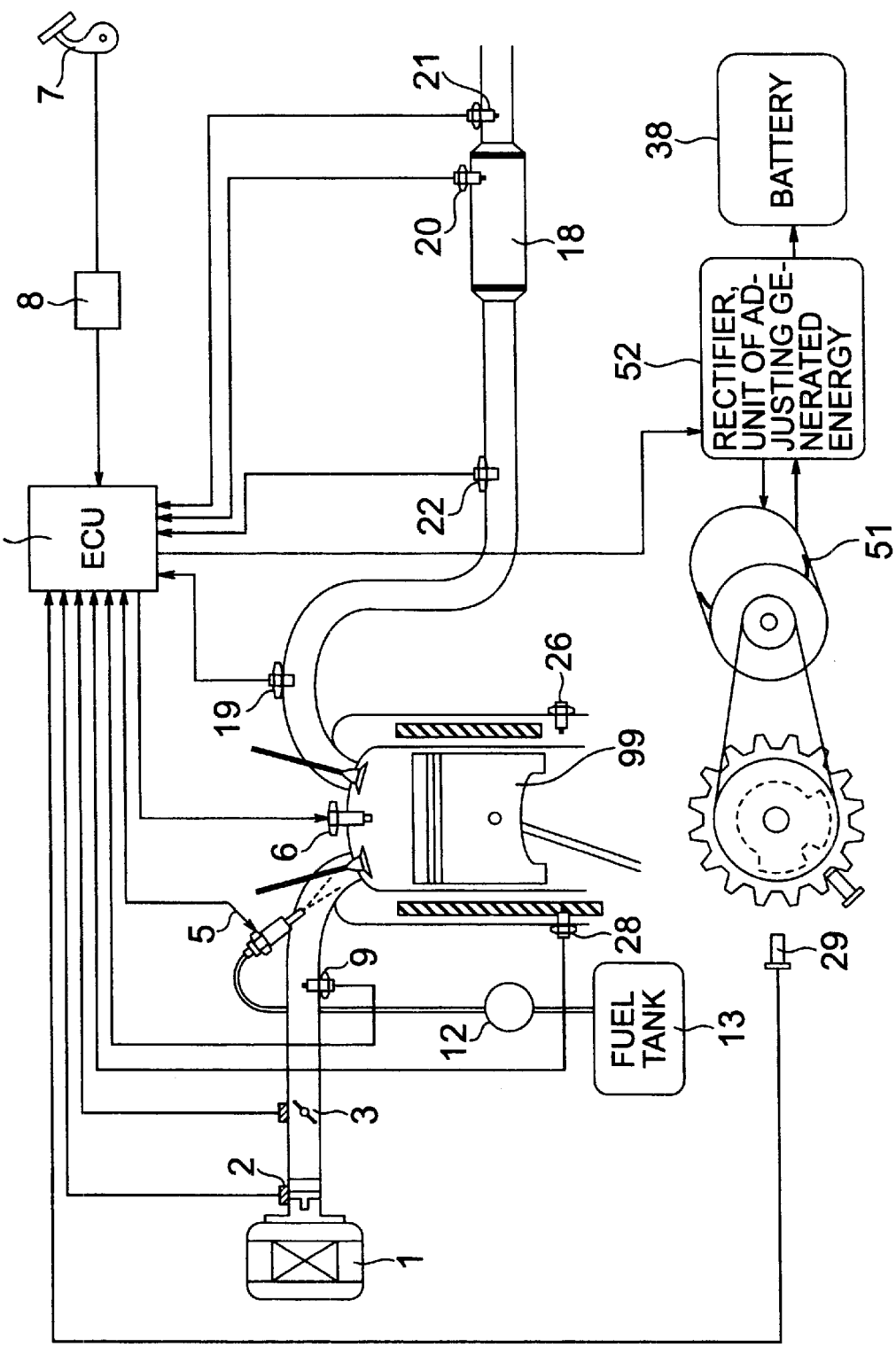
FIG. 1 is an illustration indicating a composition of an exhaust gas-purifying system of an intake port injection type internal combustion engine which is a typical embodiment of the present invention.

Symbols in drawings attached to the present specification have the following meanings. 1: air cleaner, 2: air flow sensor, 3: throttle valve, 5: injector, 6: ignition plug, 7: accelerator pedal, 8: engine load sensor, 9: intake temperature sensor, 12: fuel pump, 13: fuel tank, 18: NOx adsorption catalyst (having a three-way catalyst function), 19: oxygen sensor, 20: adsorption catalyst temperature sensor, 21: exhaust gas temperature sensor, 22: NOx concentration sensor, 25: ECU, 26: knock sensor, 28: water temperature sensor, 29: crank angle sensor, 31, 51: generator, 99: engine.

The first feature of the present invention is as follows. When time-elapsing deterioration of the NOx adsorption catalyst reaches to a predetermined degree, the combustion condition of the internal combustion engine is controlled at the stoichiometric air-fuel ratio or an excess fuel air-fuel ratio in a predetermined time period to reactivate the NOx adsorption catalyst from the time-elapsing deterioration. And, the increased proportion of the engine output generated during the above time period is absorbed with the generator.

The second feature of the present invention is as follows. When the time-elapsing deterioration of the NOx adsorption catalyst reaches to a predetermined degree, the combustion condition of the internal combustion engine is controlled at the stoichiometric air-fuel ratio or an excess fuel air-fuel ratio in a predetermined time period, and the increased proportion of the engine output generated during the above time period is absorbed with the motor utilized for driving a vehicle or the generator.

First, the outline of the present invention will be explained, and then Examples of the present invention will be explained in detail.

In the present invention, for accomplishing the state where the amount of a reducer for reducing NOx to $N_2$ is at least equivalent to that of an oxidizer, the combustion condition is controlled at the stoichiometric air-fuel ratio or an excess fuel air-fuel ratio.

Due to the above control, however, an increase in the engine output and deterioration in fuel economy occur. Therefore, energy generated with the generator or regeneration braking of the drive motor is increased for absorbing (recovering) the increased proportion of the engine output.

Since the above increased proportion of the generated energy is used later, fuel economy as a whole is improved. For example, an energy to be generated at an operating time to follow is decreased in an amount corresponding to the increased proportion of the above generated energy, whereby the load on the engine can be decreased. Further, in a hybrid electric vehicle, the motor for driving a vehicle may utilize electric power of the increased proportion of the generated energy.

The NOx adsorption catalyst absorbs sulfur contained in the exhaust gas exhausted from the internal combustion engine in place of NOx so that its NOx adsorption or absorption capability decreases. However, the adjustment of a combustion condition in the internal combustion engine to the stoichiometric air-fuel ratio or an excess fuel air-fuel ratio, an increase in an intake air flow rate to the engine, or the retardation of an ignition timing can remove the absorbed sulfur from the NOx adsorption catalyst. When the sulfur is removed, the NOx adsorption capability is reactivated.

The increased proportion of the engine output torque during the above sulfur-removing-treatment is absorbed by converting the increased output into electric energy by the generator similarly to above or increasing the regeneration braking of the drive motor of the hybrid type electric vehicle, whereby the deterioration of fuel economy can be prevented.

In the present invention, the timing for accomplishing a state where the amount of a reducer for reducing NOx to $N_2$ is at least equivalent to that of an oxidizer is as follows.

(1) The amount of exhausted NOx in a lean operation is estimated from parameters of the internal combustion engine such as an air-fuel ratio setting signal, an engine speed signal, an intake air flow rate signal, an intake manifold pressure signal, a vehicle speed signal, a throttle opening, and an exhaust gas temperature, which are decided by ECU (Engine Control Unit), and the time when its integrated value exceeds a predetermined value is the desired timing. Concerning a method of estimating the amount of the generated NOx, a NOx concentration in the exhaust gas is estimated from the air-fuel ratio A/F of the engine and the load on the engine, and a product of the estimated NOx concentration and the flow rate of the exhaust gas (almost equivalent to the intake air flow rate) is obtained and the product is integrated (added up), whereby the amount of the adsorbed NOx can be determined with accuracy.

(2) A cumulated oxygen amount is detected by signals of an oxygen sensor or an A/F sensor located at upstream or downstream of the adsorption catalyst in an exhaust passage. The desired timing is the time when the cumulated oxygen amount exceeds a predetermined amount. As a variant thereof, it is the time when the calculated oxygen amount in the lean operation exceeds a predetermined amount.

(3) A cumulated NOx amount is calculated from signals of a NOx sensor located at upstream of the adsorption catalyst in the exhaust passage, and the time when the cumulated NOx amount in the lean operation exceeds a predetermined amount is the desired timing.

(4) The concentration of NOx in the lean operation is detected by signals of a NOx sensor located at downstream of the adsorption catalyst in the exhaust duct, and the time when the concentration of NOx exceeds a predetermined concentration is the desired timing.

In the present invention, the period of time for maintaining the state where the amount of a reducer for reducing NOx to $N_2$ is equivalent to, or larger than, that of an oxidizer or the amount of a reducer to be added for maintaining the above state can be decided in advance in consideration with properties of the adsorption catalyst and characteristics and properties of the internal combustion engine. These can be accomplished by controlling strokes of a fuel injection valve, an injection time, and an injection interval.

Further, any one of the following methods may decide the timing for a treatment for recovering the time-elapsing deterioration of the NOx adsorption catalyst (sulfur-removing-treatment).

(1) The degree of time-elapsing deterioration (for example, the absorption amount of sulfur) is estimated from an air-fuel ratio setting signal, an engine speed signal, an intake air flow rate signal, an intake manifold pressure signal, a vehicle speed signal, a throttle opening, an exhaust gas temperature, an exhaust gas sensor signal, an accumulated mileage and the like, which are decided by ECU (Engine Control Unit). When the deterioration degree reaches to a predetermined value, it is the timing for a treatment of NOx catalyst.

Here, a method for estimating the degree of time-elapsing deterioration is as follows.

(a) As the accumulated mileage of a vehicle increases, deterioration of a catalyst proceeds. Therefore, when the accumulated mileage of a vehicle reaches to a predetermined value, it is evaluated that the degree of the time-elapsing deterioration reaches to a specific condition.

(b) When an integrated (added up) value of the exhaust gas amount (almost equivalent to the intake air flow rate to the engine) reaches to a predetermined value, it is judged that the degree of the time-elapsing deterioration reaches to a specific condition. Since the absorption amount of sulfur varies depending upon the exhaust gas temperature, it may be corrected based on the exhaust gas temperature.

(2) The NOx absorption or adsorption capability is obtained by signals of an exhaust sensor located at downstream of the NOx adsorption catalyst. When the above capability falls below a predetermined value, it is judged that the treatment of NOx catalyst is necessary.

The present invention will be explained more in detail with reference to concrete embodiments of the present invention hereinafter, while the present invention will not be limited to the embodiments and examples to be explained hereinafter. Needless to say, various embodiments exist within the idea range thereof.

First, with regard to "performance evaluation method", a motor vehicle having a lean-burn specified gasoline engine having a displacement of 1.8 liters was equipped with a honeycomb-like adsorption catalyst having a volume of 1.7 liters, and NOx purifying properties were estimated.

Figure 7:
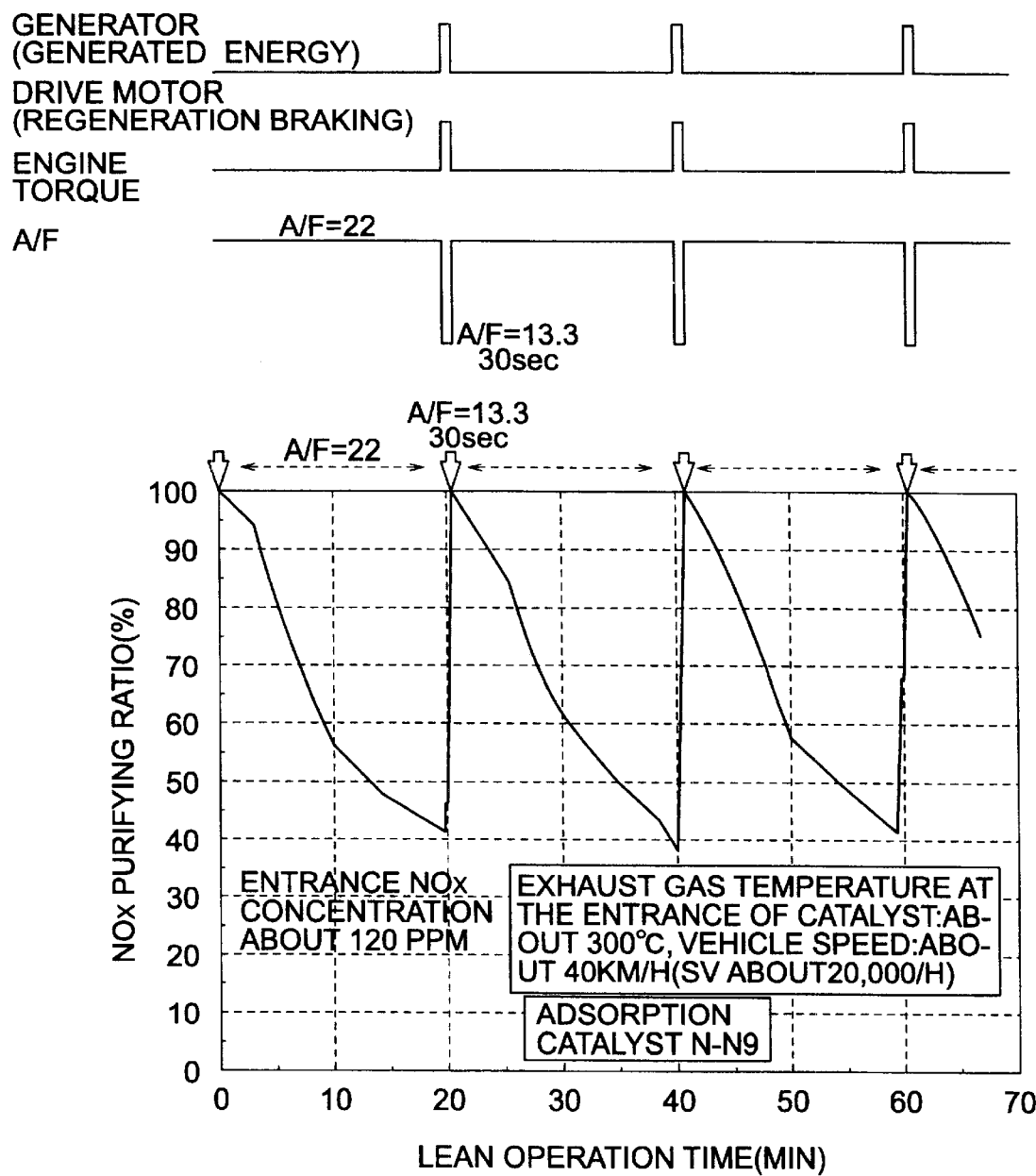
FIG. 7 shows properties of a NOx purifying ratio when a rich operation and a lean operation are alternately repeated in the present invention.

Next, with regard to "properties of adsorption catalyst", the vehicle was equipped with an adsorption catalyst "N-N9" (prototype code), a rich operation of A/F=13.3 for 30 seconds and a lean operation of A/F=22 for about 20 minutes were alternately repeated to obtain time-elapsing properties of a NOx purification ratio shown in FIG. 7. From FIG. 7, it is found that the present adsorption catalyst could purify NOx in the lean operation period.

The NOx purifying ratio gradually decreases in the lean operation, and the purifying ratio, which is 100% initially, comes to about 40% after 20 minutes.

However, the above decreased purifying ratio is renewed to 100% by the rich operation for 30 seconds. When the lean operation is performed again, the NOx purifying capability is renewed and the above time-elapsing deterioration is repeated.

Even when the lean operation and the rich operation are repeated several times, the speed of the time-elapsing deterioration of the NOx purifying ratio in the lean operation is unchanged. This fact shows that the NOx purifying capability is sufficiently renewed by the rich operation.

Since the torque (output) of the engine is increased during the 30-second rich operation of A/F=13.3 as compared with that of the lean operation, the output of the generator (generated energy) in an amount equivalent to the above increased proportion is increased so that the energy of the increased output proportion of the engine is converted into electric energy.

Thereby, torque changes to a driving axle of a vehicle due to the switching between rich and lean operations are restrained and it becomes possible to improve fuel economy at the same time.

Figure 8:
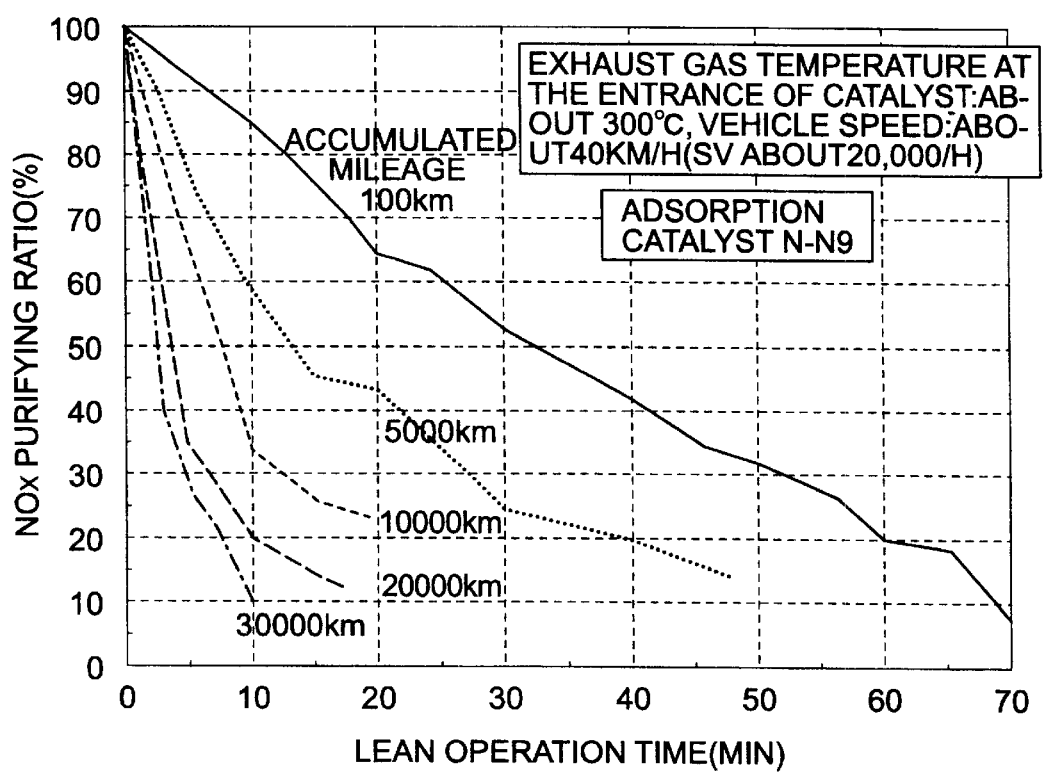
FIG. 8 is a graph for explaining a relation between the accumulated mileage of a vehicle and the NOx purifying ratio.

Further, the vehicle speed was kept at a constant speed of about 40 km/h (the spatial velocity (SV) of exhaust gas was a constant velocity of about 20,000/h), and a relationship between the travel distance of the vehicle and the NOx purifying ratio in the lean exhaust gas was determined to obtain FIG. 8.

The NOx purifying ratio decreases with time, while the decreasing speed thereof tends to quicken with increasing the accumulated mileage. It is supposed that a sulfur content contained in the exhaust gas is bonded to a NOx adsorption or absorption agent to decrease the adsorption capability of the agent, which causes the above tendency.

Figure 9:
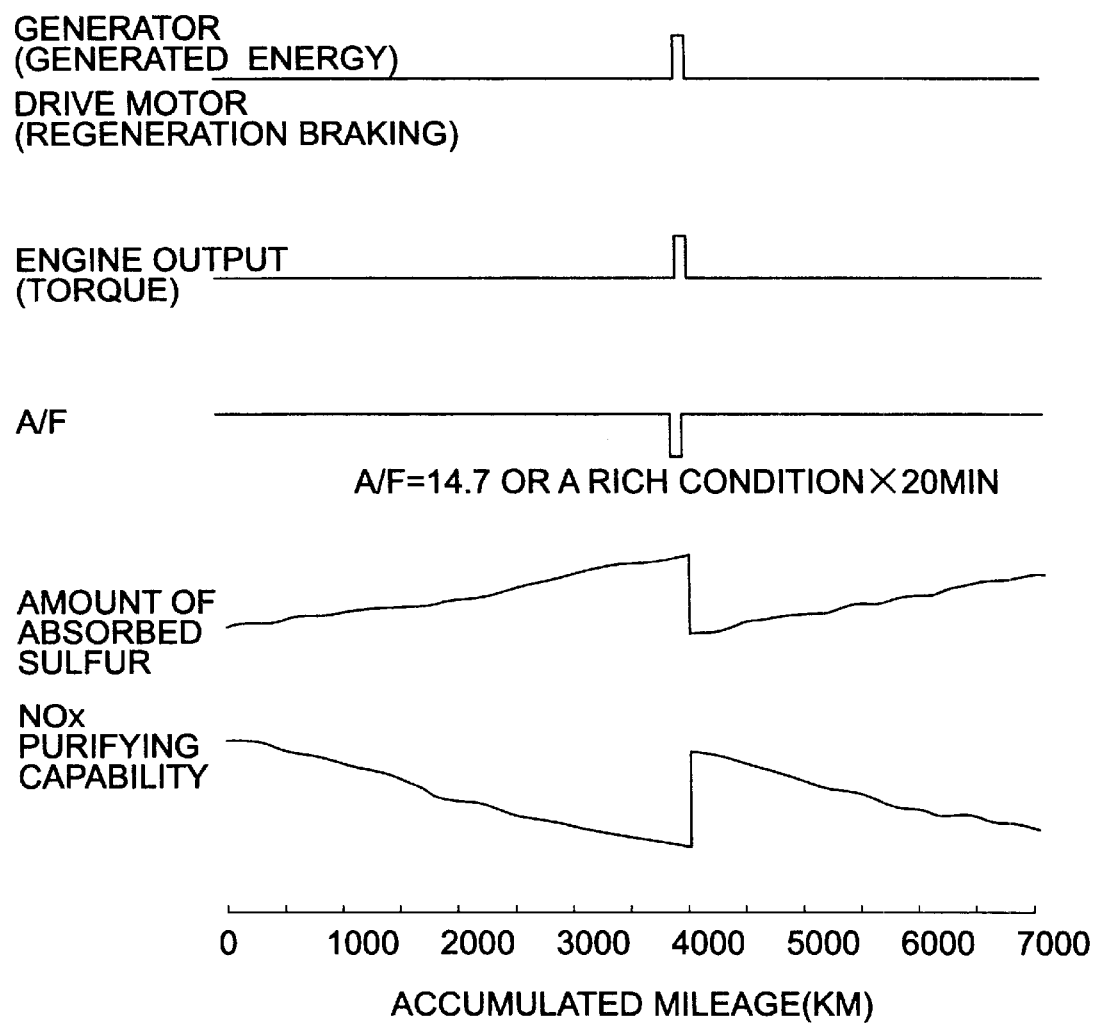
FIG. 9 is an illustration for explaining the sulfur-poisoning renewal treatment by the method of the present invention.

FIG. 9 shows changes of the NOx purifying capability (adsorption or absorption capability) obtained when a rich operation of A/F=14.7 or A/F=13.3 was performed for 20 minutes at accumulated mileage of 4,000 km.

The above treatment for the time-elapsing deterioration recovers the NOx adsorption or absorption capability of the catalyst. At the same time, the increased proportion of engine output torque generated during the treatment is converted into electric energy by increasing the load on the generator (generated energy).

Thereby, torque changes to the driving axle of a vehicle due to the switching between rich and lean operations are restrained and it becomes possible to improve fuel economy at the same time. In an operation to follow thereafter, an energy to be generated will be decreased in an amount corresponding to the increased proportion of the generated energy so that the load on the engine can be decreased. In the case of the hybrid type electric vehicle, further, the increased proportion is used as electric power for the drive motor of a vehicle.

FIGS. 10A, 10B, 11A and 11B show NOx purifying characteristics before and after switching the lean operation to the stoichiometric or rich operation.

Figure 10A:
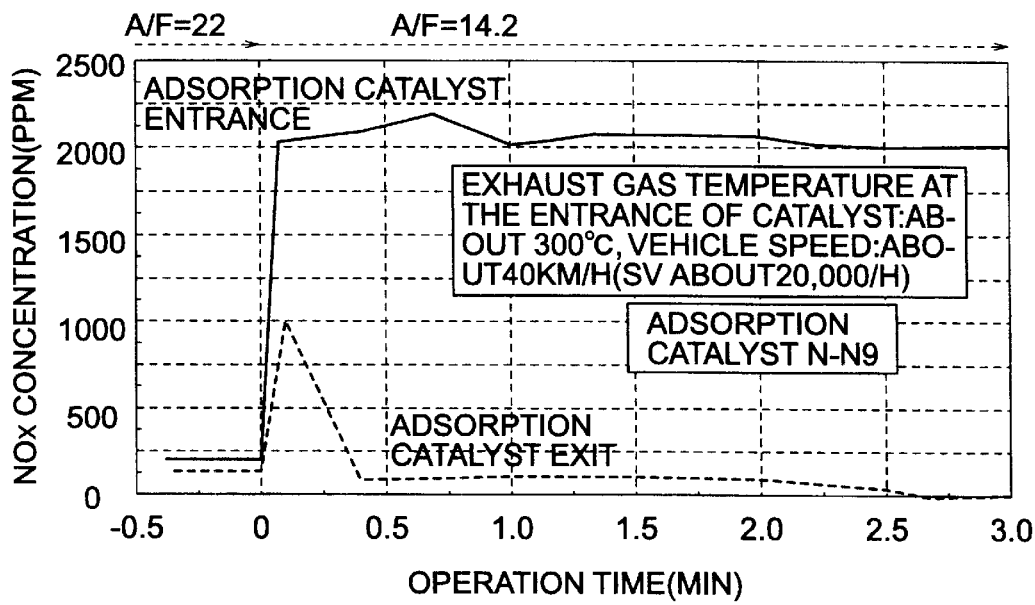
FIGS. 10A and 10B are graphs for explaining a relation between a NOx concentration at an adsorption catalyst entrance and a NOx concentration at an adsorption catalyst exit when a rich (stoichiometric) operation is shifted to a lean operation.
Figure 10B:
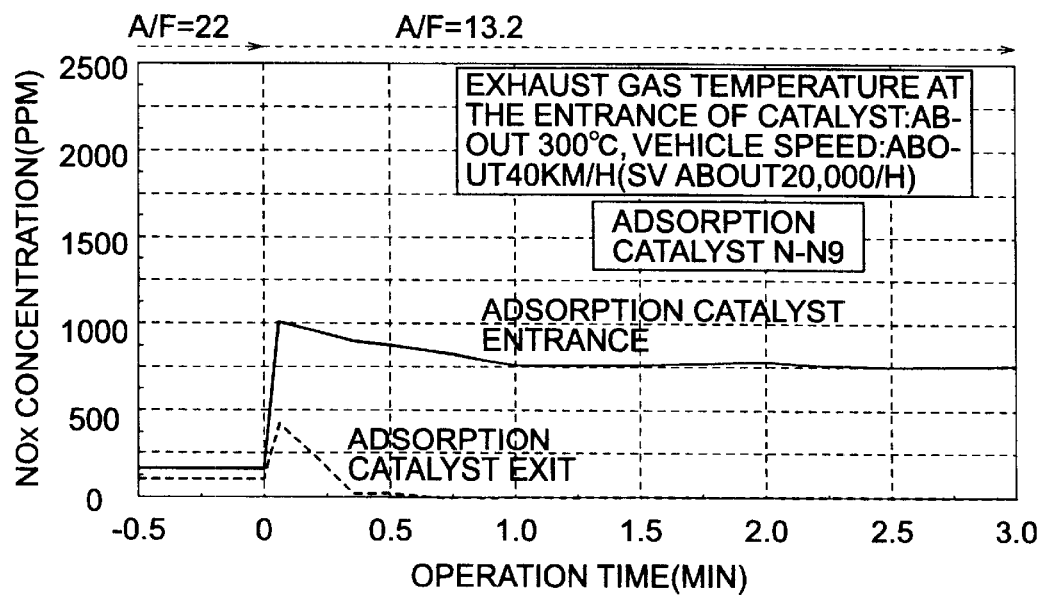

FIGS. 10A and 10B show NOx concentrations measured at the entrance and exit of the adsorption catalyst N-N9. FIG. 10A shows a case in which the air-fuel ratio was switched from a lean condition of A/F=22 to a rich condition of A/F=14.2.

Since the exhaust gas NOx concentration at A/F=14.2 is high at the starting point of reactivation soon after the switch of the air-fuel ratio to the rich operation, the entrance NOx concentration in the rich operation largely increases. In accordance with the above increase of the entrance NOx concentration, the exit NOx concentration increases transiently. However, constantly, the exit NOx concentration largely underperforms the entrance NOx concentration. The reactivation advances promptly, and the exit NOx concentration reaches to about zero in a short time.

FIG. 10B shows a case in which the air-fuel ratio was switched from a lean operation of A/F=22 to a rich operation of A/F=13.2. Similarly to FIG. 10A, the exit NOx concentration constantly largely underperforms the entrance NOx concentration, and the exit NOx concentration reaches to about zero in a shorter time.

As is evident from the above, the A/F value as a reactivation condition exerts an influence upon the time required for the reactivation.

The A/F value, the time and the amount of reducer which are suitable for the reactivation are influenced by the composition and form of an adsorption catalyst, temperature a SV value, the kind of a reducer, and the form and length of an exhaust gas passage. Therefore, the reactivation condition is comprehensively decided in consideration of these requirements.

Figure 11A:
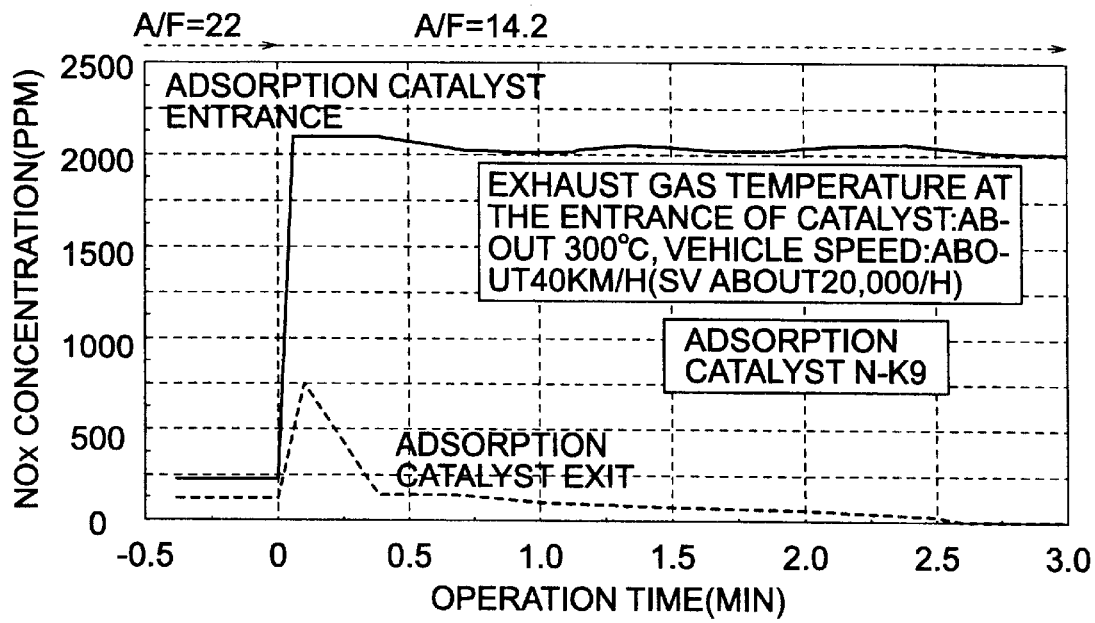
FIGS. 11A and 11B are graphs for explaining a relation between a NOx concentration at an adsorption catalyst entrance and a NOx concentration at an adsorption catalyst exit when a rich (stoichiometric) operation is shifted to a lean operation.
Figure 11B:
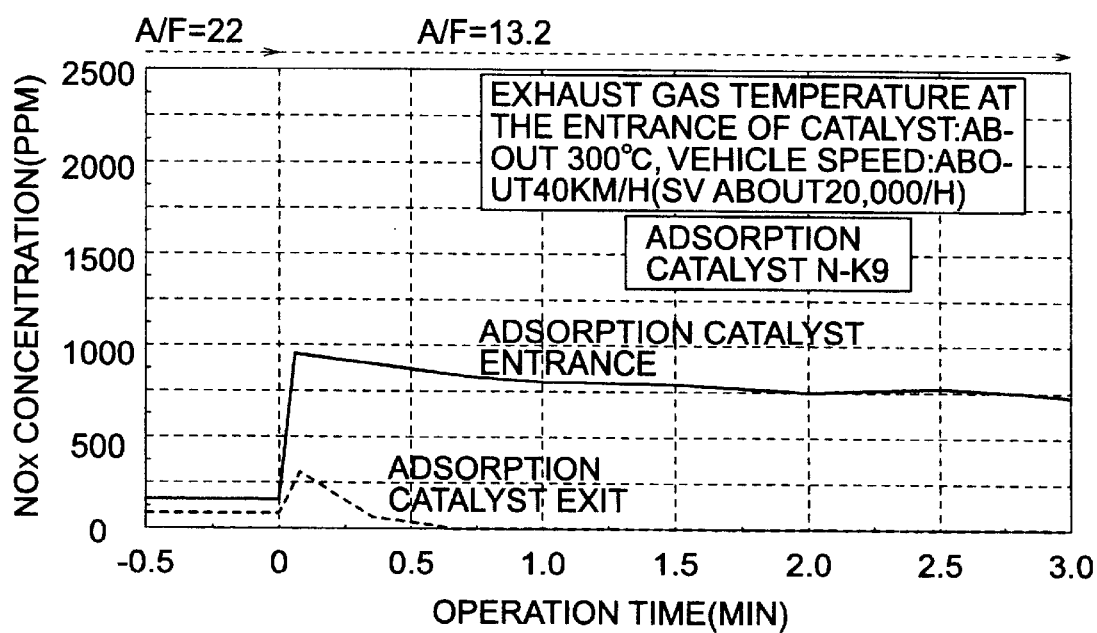

FIGS. 11A and 11B show NOx concentrations measured at the entrance and exit of an adsorption catalyst N-K9 (a prototype code). FIG. 11A shows a case in which the air-fuel ratio was switched from a lean operation of A/F=22 to a rich operation of A/F=14.2. FIG. 11B shows a case in which the air-fuel ratio was switched from a lean operation of A/F=22 to a rich operation of A/F=13.2.

In these cases, similarly to the above-described cases of the adsorption catalyst N-N9, the exit NOx concentration constantly largely underperforms the entrance NOx concentration, and the reactivation of the adsorption catalyst advances in a short time.

Next, an embodiment of the exhaust gas purifying system of the present invention will be explained based on FIG. 1.

In FIG. 1, the exhaust gas purifying system consists of an intake system comprising a lean-burn-capable internal combustion engine 99, air flow sensor 2, throttle valve 3 and the like, an exhaust system comprising an oxygen concentration sensor (or a A/F sensor) 19, an exhaust temperature sensor 22, a NOx adsorption catalyst 18 and the like, and a control unit (ECU) 25.

In addition, signals from a load sensor 8 for outputting signals responsive to pressing of an accelerator pedal 7, an air flow sensor 2 for measuring an intake air flow rate, a crank angle sensor 29 for detecting an engine speed, a catalyst temperature sensor 20 for detecting a catalyst temperature, an exhaust temperature sensor 21 for detecting an exhaust gas temperature, a throttle sensor 3 for detecting a throttle opening, a water temperature sensor 28 for detecting an engine coolant temperature, a knock sensor 26, a NOx sensor 22 for detecting a NOx concentration, etc., are input into the ECU 25.

Then, the ECU 25 decides an air-fuel ratio (A/F) from these signals, and then, the signal of the air-fuel ratio is corrected on the basis of signals fed back from the oxygen sensor to determine an amount of fuel injection.

The ECU 25 has I/O LSI as an input/output interface, a microprocessor unit MPU, storage devices (RAM, ROM and the like) which stores several control programs, and a timer counter.

The above exhaust gas purifying system performs operations to be explained in outline hereinafter.

First, intake air to the engine is filtered with an air cleaner 1, measured for its amount with the air flow sensor 2, passed through the throttle valve 3, mixed with fuel injected from the injector 5, and fed to the engine 99.

Signals from the air flow sensor and signals from other sensors are input into the ECU 25. In the ECU 25, the operation condition of the engine and the condition of the NOx adsorption catalyst are evaluated by a method to be described later to determine an operation air-fuel ratio, and an injection time of the injector 5 or the like is controlled to set the fuel concentration of an air-fuel mixture at a predetermined value.

The air-fuel mixture inhaled to a cylinder is ignited with an ignition plug 6 which is controlled with signals from the ECU 25 and burnt, and then the combustion exhaust gas is led to an exhaust purification system.

The exhaust purification system is provided with the NOx adsorption catalyst 18. In the stoichiometric operation, its three-way catalyst function purifies or deoxidizes NOx and oxidizes HC and CO in the exhaust gas. Further, in the lean operation, its NOx adsorption function purifies NOx, and concurrently its combustion function burns and oxidizes HC and CO.

In the lean operation, further, the NOx purifying capability of the NOx adsorption catalyst is constantly judged by judgements and control signals of the ECU. When the NOx purifying capability is decreased, the air-fuel ratio of combustion is shifted to a rich side and the NOx adsorption capability of the adsorption catalyst is reactivated.

While the air-fuel ratio is shifted to the rich side, much gasoline is fed so that consequently the engine output is increased and fuel economy is deteriorated.

In the present examples, therefore, the output of a generator 51 is increased with a generated energy adjusting unit 52 by means of a command from the ECU 25 for absorbing (recovering) the above increased proportion of the output and the addition of the output from the generator 51 is charged into a battery 38. The above addition of the generated energy is used later operation so that fuel economy is improved as a whole. For example, an energy to be generated in an operation to follow is decreased in an amount corresponding to the creased proportion of the generated energy, whereby the load on the engine may be decreased.

Figure 2:
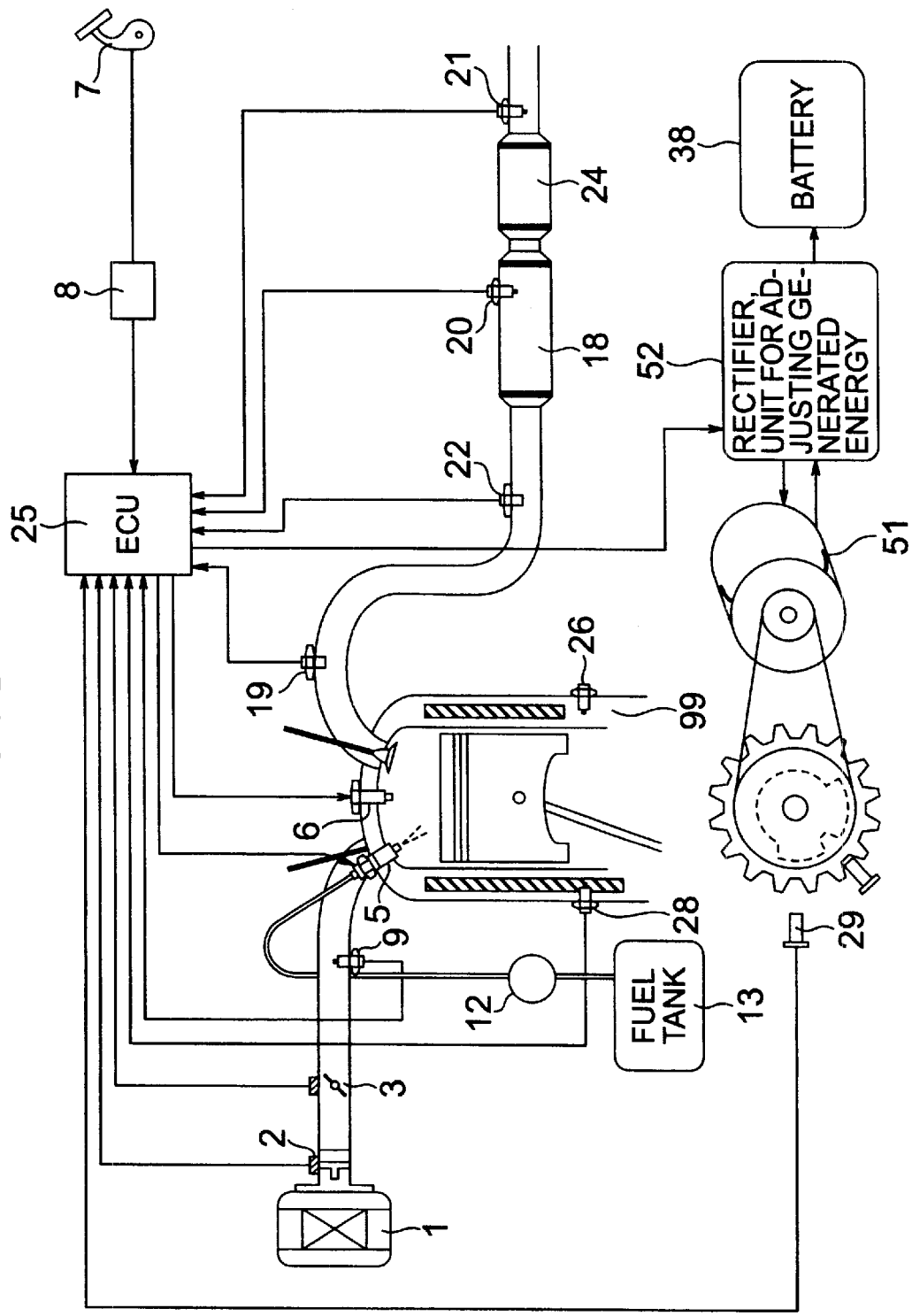
FIG. 2 is an illustration indicating a composition of an exhaust gas-purifying system of an cylinder injection type internal combustion engine (a direct injection engine) which is a typical embodiment of the present invention.

FIG. 2 shows an example of an engine in which a cylinder is equipped with the fuel injection valve 5 differently from FIG. 1 and fuel is directly fed to the cylinder.

Figure 3:
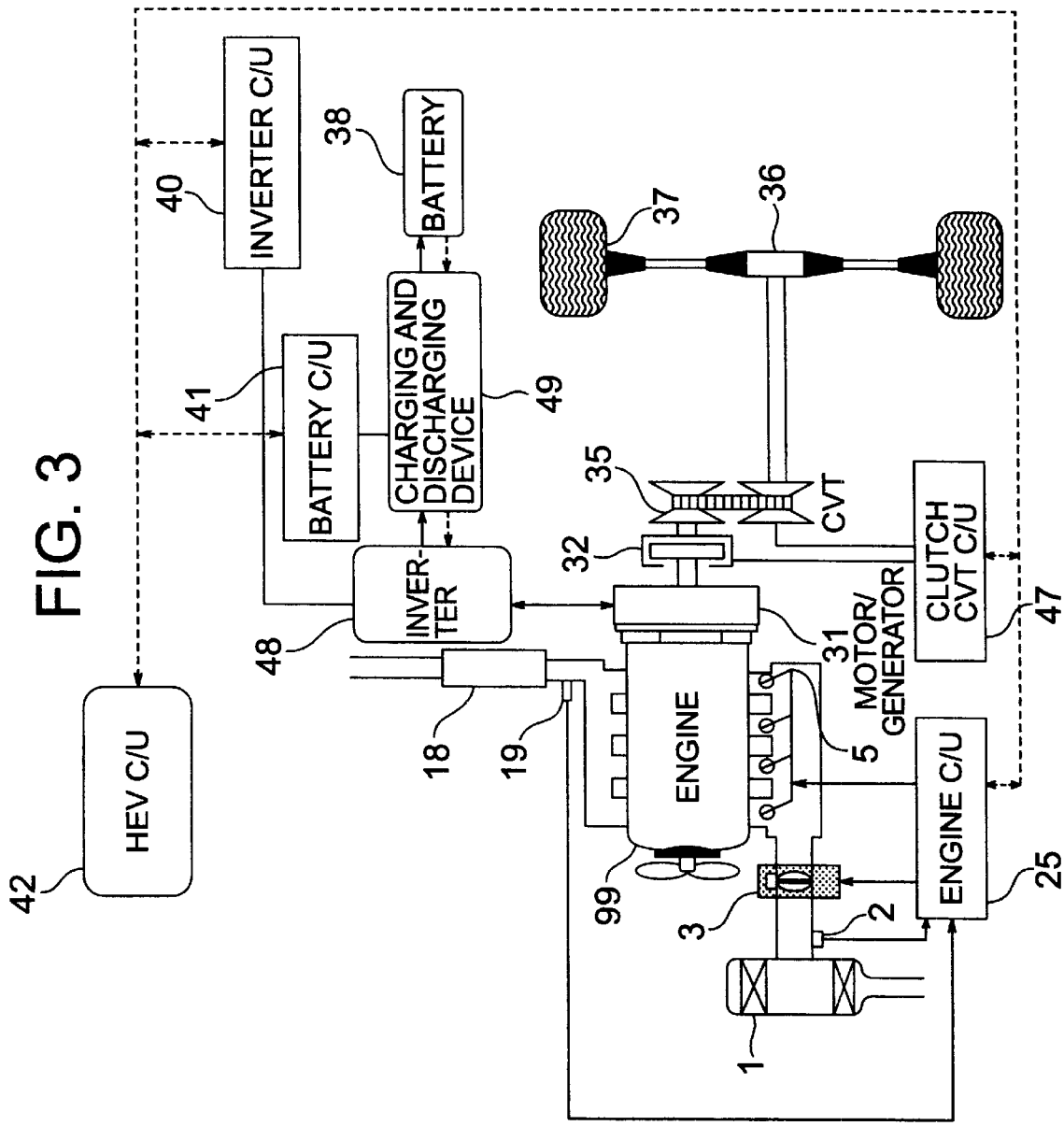
FIG. 3 is an illustration indicating a composition of an exhaust gas-purifying system of an internal combustion engine in a simplified hybrid type electric vehicle in the present invention.
Figure 4:
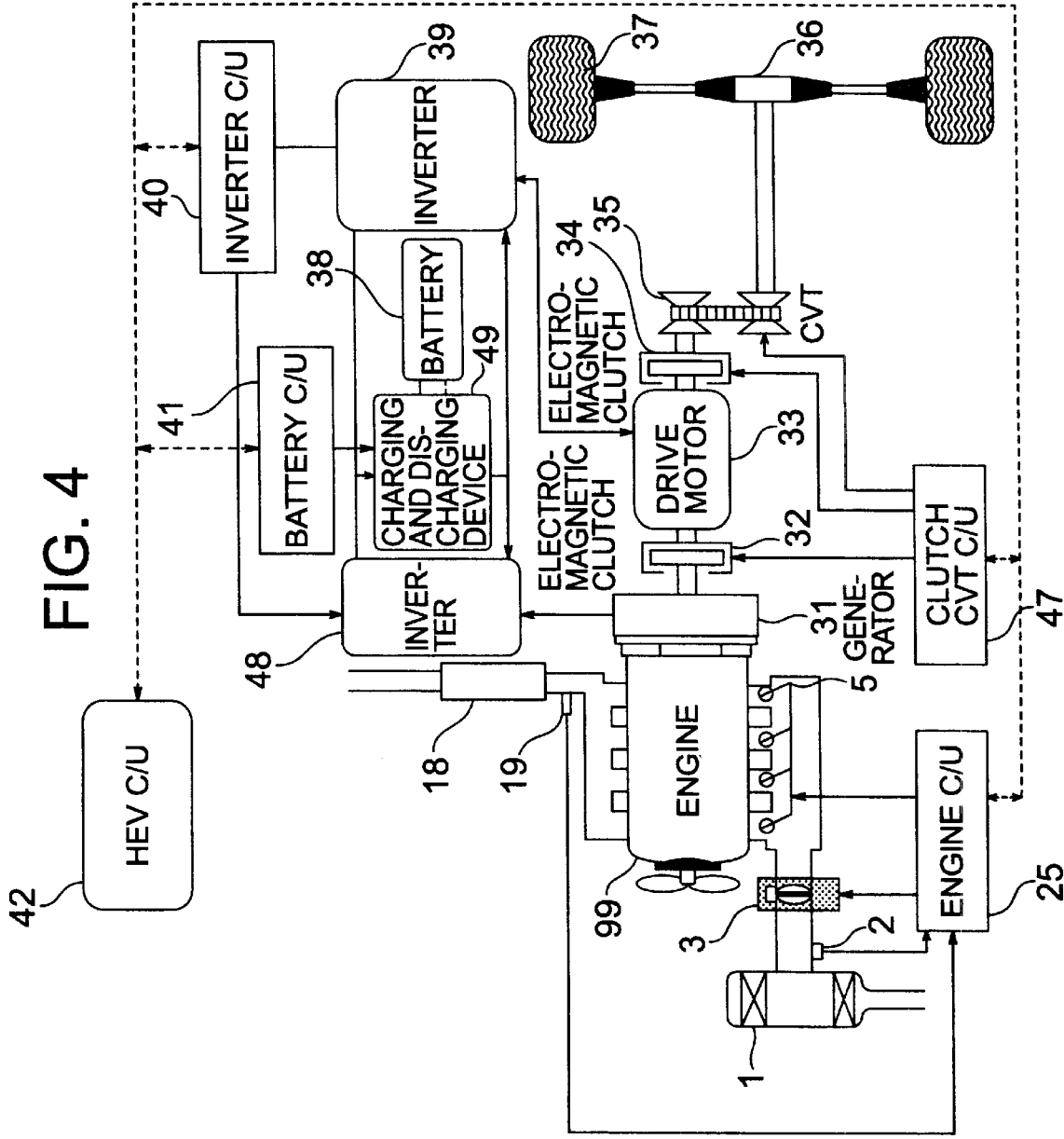
FIG. 4 is an illustration indicating a composition of an exhaust gas-purifying system of an internal combustion engine in a hybrid type electric vehicle in the present invention.

In hybrid type electric vehicles shown in FIG. 3 and FIG. 4, an electric power corresponding to the increased proportion of the generated energy of the generator 31 is used for the motor for driving a vehicle, or the regeneration braking of the drive motor is increased, whereby the above electric power is used for charging the battery.

On the other hand, the NOx adsorption catalyst absorbs sulfur contained in the exhaust gas from the engine in place of NOx, so that its NOx adsorption or absorption capability is decreased. However, the control of the combustion condition in the engine to the stoichiometric air-fuel ratio or an excess fuel air-fuel ratio, an increase in the intake air flow rate to the engine, or the adjustment of an ignition timing or an fuel injection timing can remove the absorbed sulfur from the NOx adsorption catalyst. When the sulfur is removed, the NOx adsorption capability is recovered.

The increased proportion of the engine output during the above sulfur-removing-treatment is absorbed (recovered) by increasing the generation energy of the generators 51 and 31 similarly to above description or increasing the regeneration braking of the drive motor of a hybrid type electric vehicle, whereby deterioration in fuel economy can be prevented.

Owing to the above procedures, the present system effectively purifies the exhaust gas under all the engine combustion conditions of the lean operation and the stoichiometric (including rich operation) operation.

FIG. 3 shows an example of a simplified hybrid type electric vehicle. In FIG. 3, the engine is equipped with a motor/generator 31 comprising functions of a motor for starting an engine and a generator, the NOx adsorption catalyst 18 is provided in the exhaust system, and the increased proportion of the generated energy is recovered through an inverter 48 and a charging and discharging device 49.

The controls of these are optically carried out with a HEV control unit 42, a battery control unit 41 and an inverter control unit 40. Further, 36 is a differential gear system, and 37 are wheels. The HEV control unit 42 is a Hybrid Electric Vehicle control unit which includes a microcomputer, memory devices and an input/output signal interface unit. The HEV control unit 42 controls and manages the operation of the hybrid vehicle so as to optimize the fuel economy, driveability and charging/discharging of the battery system.

FIG. 4 shows an example of the hybrid type electric vehicle, in which the engine is equipped with the generator 31, and the drive motor 33 is provided between a mechanical-belt type continuously variable transmission CVT 35 and the generator 31 through electro-magnetic clutches 32 and 34.

When the electro-magnetic clutch 32 is released and the electro-magnetic clutch 34 is engaged, vehicle can drive with the drive motor 32 alone.

Further, needless to say, the charging and discharging of the battery, the controls of the engine, the drive motor, the generator and the electro-magnetic clutches are respectively optimally performed with the battery control unit 41, the engine control unit 25, the inverter control unit 40, and the HEV control unit 42.

Figure 5:
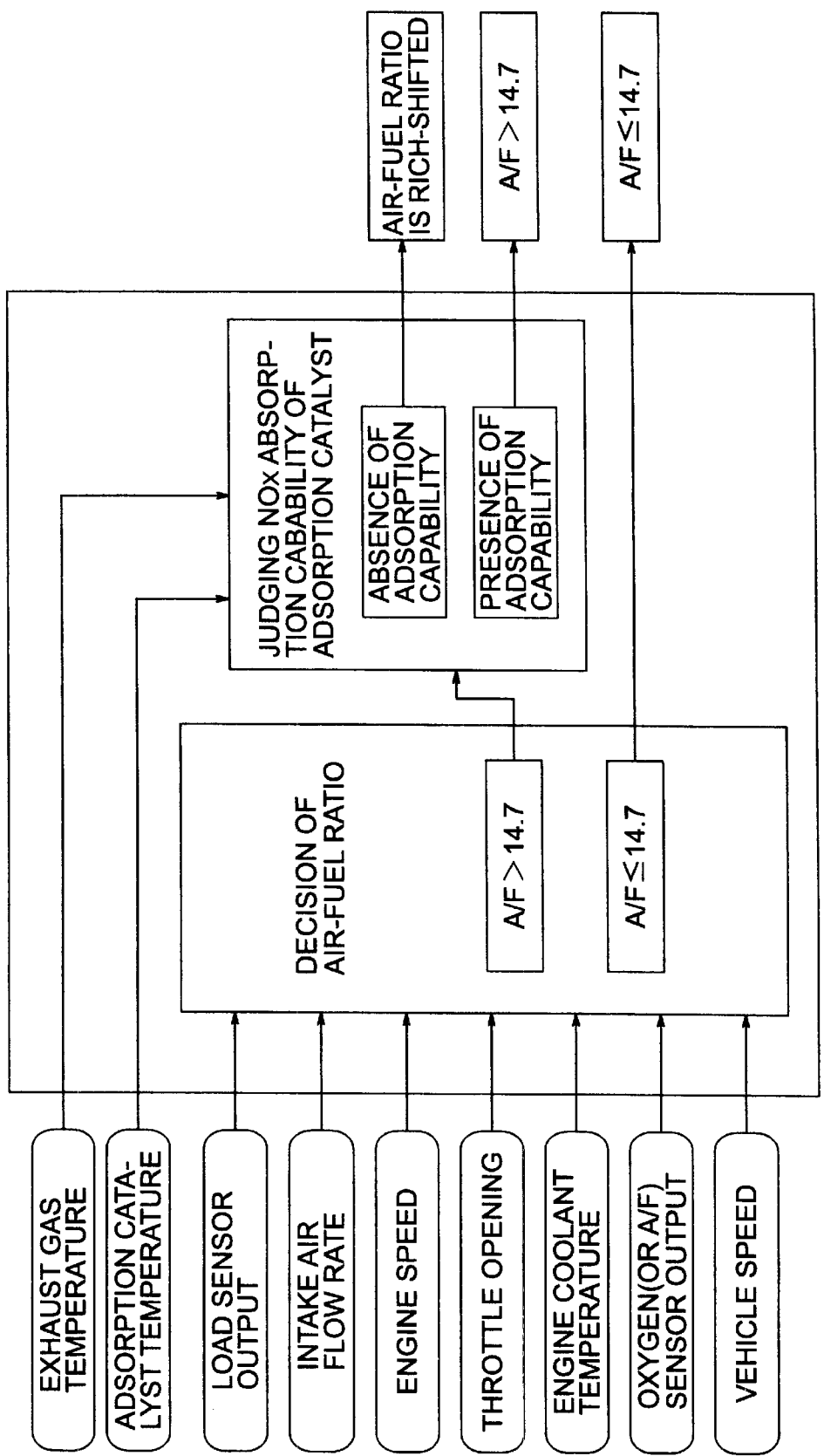
FIG. 5 is a block diagram indicating a control method of an air-fuel ratio at a NOx reactivation treatment time.

In FIG. 5, the block diagram shows a method of controlling the air-fuel ratio of an air-fuel mixture fed to the engine for reducing the adsorbed NOx.

First, the ECU 25 determines an air-fuel ratio (A/F) from information such as a load sensor 8 output for outputting a signal responsive to pressing of an accelerator pedal 1, an output signal of intake air flow rate measured with the air flow sensor 2, an engine speed signal detected with the crank angle sensor 29, an exhaust gas temperature signal, a throttle sensor signal for detecting a throttle opening, an engine coolant temperature signal, a starter signal, and a vehicle speed. Further, the signal of the air-fuel ratio is corrected on the basis of a signal fed back from the oxygen sensor 19 to determine an amount of fuel to be injected.

Further, if a feed back control is carried out at a low temperature, at idle or at a heavey load condition, there may be a problem that the combustion is unstable or no output is obtained. Therefore, the feed back control is not made in such conditions according to the signals of sensors and switchs.

Further, a known learning mechanism of air-fuel ratio correction responds so as rightly to respond to a delicate change or an abrupt change of the air-fuel ratio.

When the determined air-fuel ratio is stoichiometric (A/F=14.7) and rich (A/F<14.7), a command from the ECU decides an injection condition of the injector and the stoichiometric and rich operation is performed.

On the other hand, when it is decided to perform a lean operation (A/F>14.7), the presence or absence of the NOx adsorption capability of the NOx adsorption catalyst is judged. When the presence thereof is recognized, the fuel injection amount is decided so as to perform a lean operation as prescribed. When the absence of the NOx adsorption capability is recognized, the air-fuel ratio is shifted to a rich side in a predetermined time to reactivate the NOx adsorption catalyst.

Figure 6:
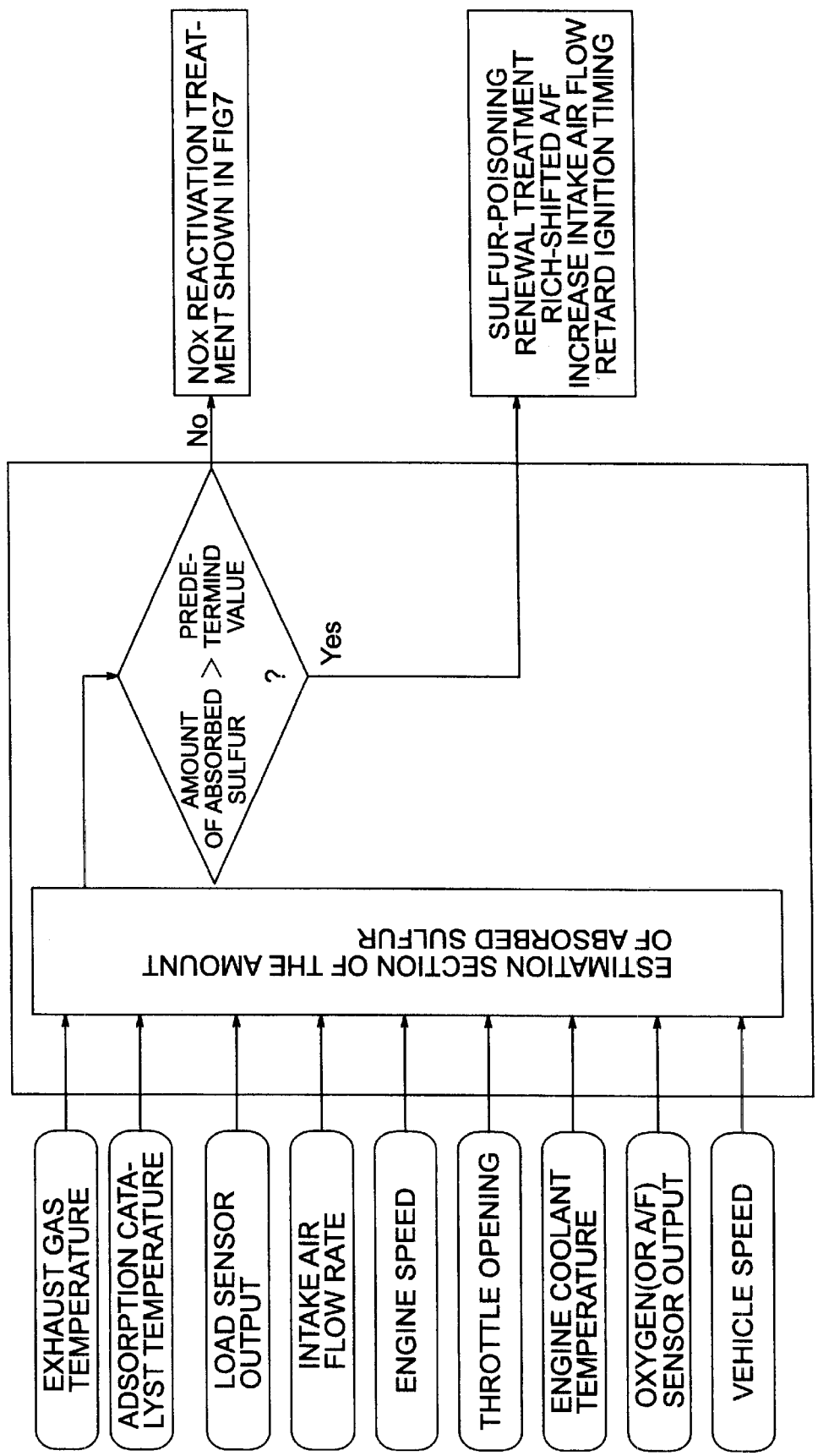
FIG. 6 is a block diagram indicating a control method at a sulfur-poisoning renewal treatment time.

The block diagram in FIG. 6 shows the air-fuel ratio of an air-fuel mixture fed to the engine for removing the adsorbed sulfur from the Nox adsorption catalyst. The ECU 25 estimates the amount of the absorbed sulfur, which is adsorbed with the NOx adsorption catalyst, from information such as a load sensor output for outputting a signal responsive to pressing of an accelerator pedal, an output signal of intake air flow rate measured with the air flow sensor 2, an engine speed signal detected with the crank angle sensor, an exhaust gas temperature signal, a throttle sensor signal for detecting the opening of a throttle, an engine coolant temperature signal, a starter signal, and a vehicle speed. When the estimated value exceeds a predetermined value, the air-fuel ratio is shifted to a rich side or the intake air flow rate is increased for a sulfur-poisoning renewal treatment.

When the above control is insufficient for the renewal treatment, further, the ignition timing is retarded to increase the exhaust temperature. Owing to this, the sulfur is removed from the NOx adsorption catalyst, and its function is recovered.

The amount of the absorbed sulfur is estimated as follows.

(a) As the accumulated mileage of a vehicle increases, the deterioration of catalyst proceeds. Therefore, when the accumulated mileage of the vehicle reaches to a predetermined value, it is judged that the time-elapsing deterioration degree reaches to a predetermined value.

(b) When an integrated (added-up) value of the amount of exhaust gas (almost equivalent to the intake air flow rate to the engine) reaches to a predetermined value, it is judged that the time-elapsing deterioration degree reaches to a predetermined value. Since the absorption amount of sulfur varies depending upon the exhaust temperature, it may be corrected based on the exhaust temperature.

Figure 12:
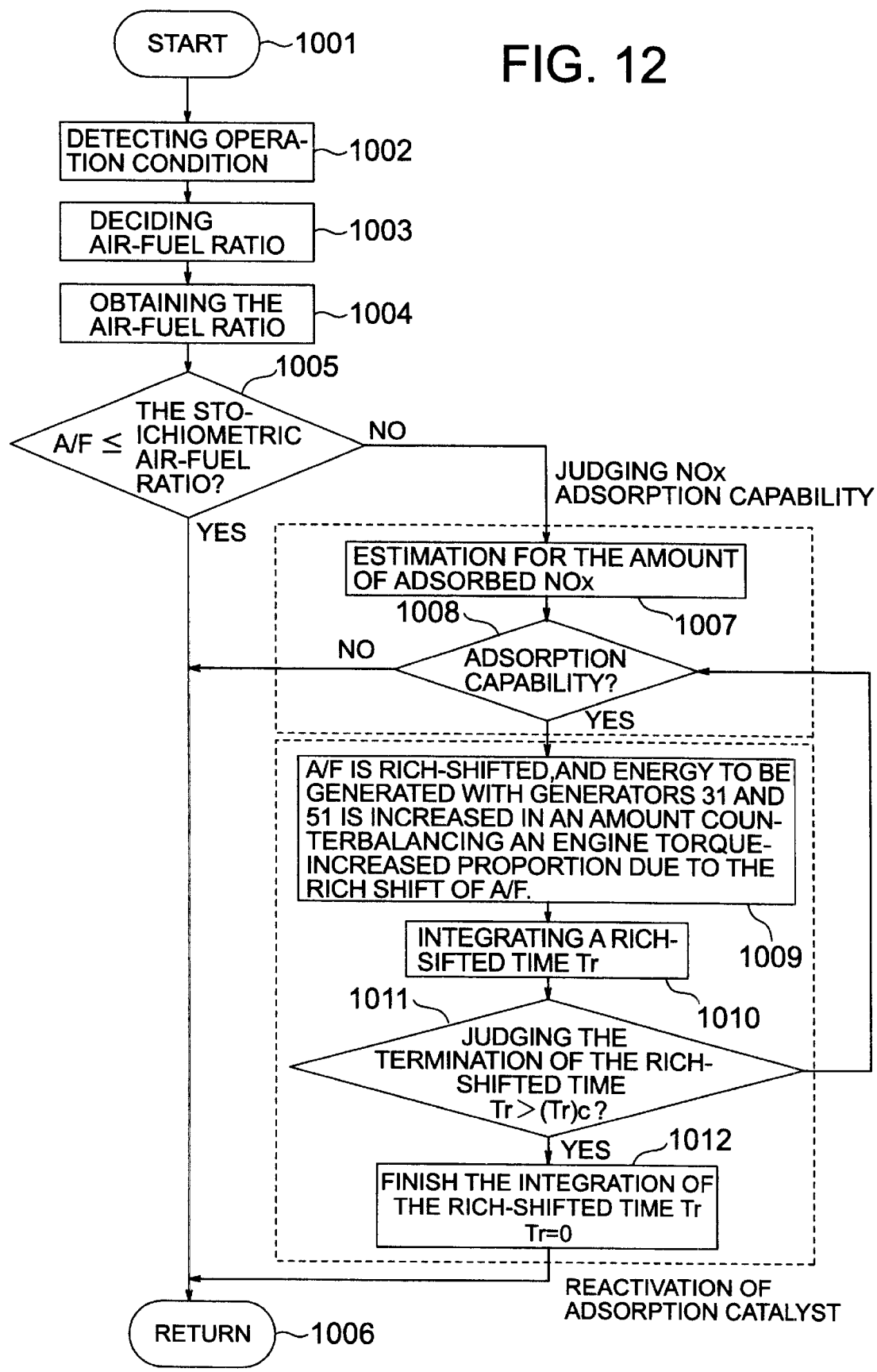
FIG. 12 is a flow chart for indicating the control method of NOx reactivation treatment.

FIG. 12 shows a flow chart of an air-fuel ratio control for reducing the adsorbed NOx.

After starting in step 1002, various operation conditions are instructed or signals to detect an operating condition are read in step 1002.

In step 1003, the air-fuel ratio is determined on the basis of these signals. Instep 1004, the determined air-fuel ratio is obtained.

In step 1005, the determined air-fuel ratio of stop 1003 is compared with the stoichiometric air-fuel ratio. Here, to speak properly, the stoichiometric air-fuel ratio which is a comparative target is an air-fuel ratio in which the speed of catalytic reduction of NOx in the adsorption catalyst exceeds a capturing speed due to the adsorption, and it is decided by precedently evaluating properties of the adsorption catalyst. An air-fuel ratio near the stoichiometric air-fuel ratio is selected.

As a result of the comparison in this step, in the case of the set air-fuel ratio≦the stoichiometric air-fuel ratio, advance to step 1006, in which no reactivation treatment of the adsorption catalyst is carried out and an operation is performed in a prescribed air-fuel ratio.

In the case of the set air-fuel ratio>the stoichiometric air-fuel ratio, advance to step 1007. In step 1007, an estimation operation of NOx adsorbed amount is carried out.

Then, in step 1008, it is judged whether the estimated NOx adsorbed amount is smaller than or equal to a predetermined limit or not.

Concerning the above limit adsorption amount, the NOx adsorption catalyst is evaluated for NOx capturing characteristic data by an experiment in advance, the exhaust gas temperature, the temperature of the adsorption catalyst and the like are taken into account, and the limit adsorption amount is set at a value sufficient for purifying NOx contained in the exhaust gas.

When the NOx adsorption capability is present, advance to step 1006 in which no reactivation treatment of the adsorption catalyst is carried out and an operation is performed in a prescribed air-fuel ratio.

When the NOx adsorption capability is absent, advance to step 1009, in which the air-fuel ratio is shifted to a rich side, and concurrently the generation energy of the generators 31 and 51 is increased in an amount counterbalancing a torque-increased proportion due to the rich operation or the regeneration braking of the drive motor of a hybrid type electric vehicle is increased.

In step 1010, a rich shift time is counted, and when an elapsed time Tr exceeds a predetermined time $(Tr)c$, the rich shift is terminated.

Figure 13:
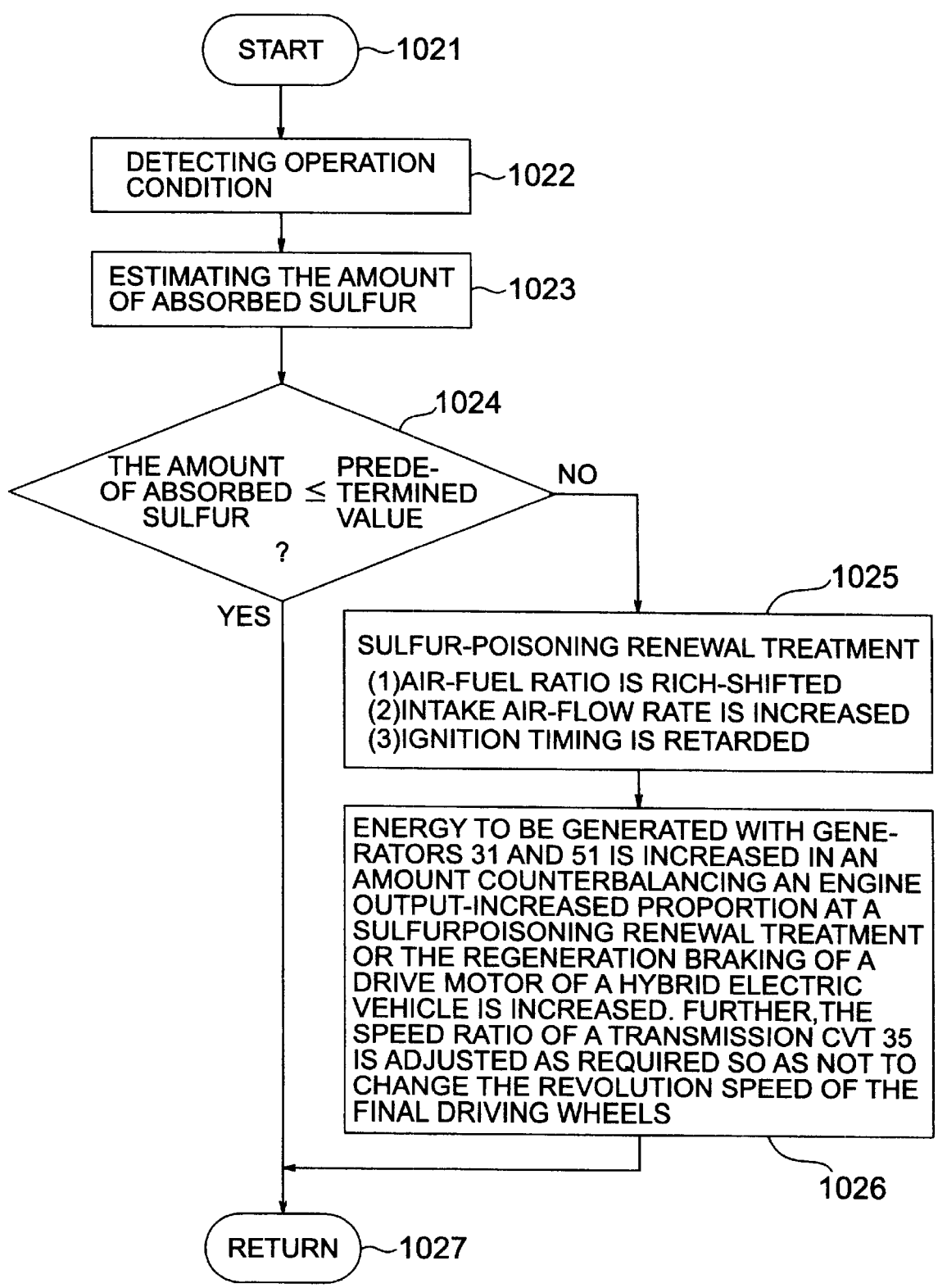
FIG. 13 is a flow chart for indicating the control method of sulfur-poisoning renewal treatment.

FIG. 13 shows a flow chart of the sulfur-poisoning renewal treatment.

In step 1021, various operating conditions are instructed or signals to detect an operating condition are read.

In step 1023, the sulfur absorption amount is estimated on the basis of these signals.

In step 1024, a determined air-fuel ratio is detected, and the absorption amount calculated in step 1023 is compared with a predetermined value.

In the case of the sulfur absorption amount≦the predetermined value, advance to step 1027 in which an operation is performed in a prescribed air-fuel ratio without any sulfur-poisoning renewal treatment.

In the case of the sulfur absorption amount>the predetermined value, advance to step 1025. In step 1025, the air-fuel ratio is shifted to a rich side or the intake air flow rate is increased for the sulfur-poisoning renewal treatment in a predetermined period of time (20 minutes, time period required for removing sulfur). When insufficient, the exhaust gas temperature is increased by an ignition retardation together with the above countermeasures.

Thereby, the sulfur is removed from the NOx adsorption catalyst, and the function is recovered.

Then, in step 1026, the generated energy of the generators 31 and 51 is increased in an amount counterbalancing a torque(output)-increased proportion due to the rich operation or the regeneration braking of the drive motor of a hybrid type electric vehicle is increased.

Further, the speed ratio of the transmission CVT 35 may be adjusted as required so as not to change the number of revolutions of the final driving wheel of a vehicle.

According to the present invention, a generator with which an engine is equipped can recover the increased proportion of an engine torque (output) generated at a reactivation treatment time of NOx adsorbed to a NOx adsorption catalyst and at a renewal treatment time of a sulfur-poisoning causing the deterioration of a catalyst. Therefore, deterioration in fuel economy can be prevented at the reactivation treatment.

What is claimed is:

1. An exhaust gas purifying system of an internal combustion engine, comprising
    a generator driven by said internal combustion engine;
    a battery charged with an electricity generation output from said generator; and
    a NOx adsorption catalyst placed in an exhaust gas passage, which catalyst chemically sorbs NOx in a state where the amount of an oxidizer is larger than that of a reducer in the stoichiometry relation of oxidation reduction between components contained in exhaust gas exhausted from said internal combustion engine and which catalytically reduces the adsorbed or absorbed NOx in a state where the amount of the reducer is at least equivalent to that of the oxidizer,
    said system further comprising:
    a sulfur-poisoning estimation means for estimating sulfur-poisoning of the NOx adsorption catalyst at an operation time from operational parameters of said internal combustion engine;

a sulfur-poisoning evaluation means for evaluating when an of sulfur absorption estimated value exceeds a predetermined value;

an air-fuel mixture control means for controlling the combustion condition of said internal combustion engine to the stoichiometric air-fuel ratio or a rich air-fuel ratio in a predetermined time period when it is evaluated by said sulfur-poisoning evaluation means that the estimated value exceeds a predetermined value, means for increasing an air flow rate more than a present air flow rate; and an absorption means which makes said generator absorb the increased proportion of the internal combustion engine output generated while the combustion condition of said internal combustion engine is controlled to the stoichiometric air-fuel ratio or a rich air-fuel ratio by said air-fuel mixture control means.

2. An exhaust gas purifying system of an internal combustion engine, comprising:

a generator driven by said internal combustion engine;

a battery charged with an electricity generation output from said generator;

a drive motor which is driven by an output from said battery and drives a vehicle;

means for opening and closing a mechanical coupling between said generator and said drive motor; and a NOx adsorption catalyst placed in an exhaust gas duct, which catalyst chemically sorbs NOx in a state where the amount of an oxidizer is larger than that of a reducer in the stoichiometry relation of oxidation reduction between components contained in exhaust gas and which catalytically reduces the adsorbed or absorbed NOx in a state where the amount or the reducer is at least equivalent to that of the oxidizer, said system further comprising:

a sulfur-poisoning estimation means for estimating sulfur-poisoning of the NOx adsorption catalyst at an operation time from operational parameters of said internal combustion engine;

a sulfur-poisoning evaluation means for evaluating when an estimated value of sulfur absorption exceeds a predetermined value;

an air-fuel mixture control means for controlling the combustion condition of said internal combustion engine to the stoichiometric air-fuel ratio or a rich air-fuel ratio in a predetermined time period when it is evaluated by said sulfur-poisoning evaluation means that the estimated value exceeds a predetermined value;

means for increasing an air flow rate more than a present air flow rate; and an adsorption means which makes said generator or said drive motor absorb the increased proportion of the internal combustion engine output generated while the combustion condition of said internal combustion engine is controlled to the stoichiometric air-fuel ratio or a rich air-fuel ratio by said air-fuel mixture control means.

3. An exhaust gas purifying system of an internal combustion engine according to claim 1, wherein together with the control of the combustion condition of said internal combustion engine to the stoichiometric air-fuel ratio or a rich fuel air-fuel ratio by said air-fuel mixture control means, at least one of an ignition timing control means for controlling an ignition timing and a fuel-injection timing control means for controlling an fuel-injection timing is adjusted while said air-fuel mixture control means is operated.

* * * * *